United States Patent [19]

Nimitz et al.

[11] Patent Number: 5,716,549

[45] Date of Patent: Feb. 10, 1998

[54] FLUOROIODOCARBON BLENDS AS CFC AND HALON REPLACEMENTS

[75] Inventors: Jonathan Shelley Nimitz, Albuquerque, N. Mex.; Lance Harrell Lankford, Newcastle, Calif.

[73] Assignee: Ikon Corporation, Carson City, Nev.

[21] Appl. No.: 701,669

[22] Filed: Aug. 22, 1996

Related U.S. Application Data

[63] Continuation of Ser. No. 27,227, Mar. 5, 1993, Pat. No. 5,611,210.

[51] Int. Cl.$^6$ .......................... C23G 5/028; A62D 1/00; C09K 5/00; C09K 3/30

[52] U.S. Cl. .......................... 252/364; 252/2; 252/8; 252/67; 252/69; 252/305; 252/306; 252/372

[58] Field of Search .......................... 252/2, 8, 67, 68, 252/69, 305, 306, 364, 372

[56] References Cited

U.S. PATENT DOCUMENTS

| | | | |
|---|---|---|---|
| 3,479,286 | 11/1969 | Gambaretto et al. | 252/8 |
| 3,480,545 | 11/1969 | Dale | 252/2 |
| 3,657,120 | 4/1972 | Porst | 252/8 |
| 3,822,207 | 7/1974 | Howard et al. | 252/8 |
| 3,879,297 | 4/1975 | Languille et al. | 252/8 |
| 3,884,828 | 5/1975 | Butler | 252/305 |
| 4,005,137 | 1/1977 | Rudolph et al. | 562/605 |
| 4,073,879 | 2/1978 | Long, Jr. | 424/9.4 |
| 4,097,344 | 6/1978 | Drury | 205/415 |
| 4,118,290 | 10/1978 | Semmler et al. | 205/460 |
| 4,226,728 | 10/1980 | Kung | 252/8 |
| 4,510,064 | 4/1985 | Ermak | 252/67 |
| 4,557,851 | 12/1985 | Enjo et al. | 252/70 |
| 4,560,697 | 12/1985 | Richardson et al. | 514/383 |
| 4,581,101 | 4/1986 | Senoue et al. | 156/643.1 |
| 4,587,366 | 5/1986 | Von Werner | 570/172 |
| 4,606,832 | 8/1986 | Hisamoto et al. | 252/8 |
| 4,717,744 | 1/1988 | Boutevin et al. | 524/17 |
| 4,725,551 | 2/1988 | Thompson | 436/3 |
| 4,794,200 | 12/1988 | Tordeux et al. | 570/170 |
| 4,830,762 | 5/1989 | Yamaguchi et al. | 252/2 |
| 4,863,630 | 9/1989 | Swan et al. | 510/410 |
| 4,873,027 | 10/1989 | Vmemoto et al. | 562/83 |
| 4,900,365 | 2/1990 | Lund et al. | 134/12 |
| 4,922,041 | 5/1990 | Naumann et al. | 570/141 |
| 4,923,626 | 5/1990 | Tamura et al. | 510/525 |
| 4,954,271 | 9/1990 | Green | 252/8 |
| 4,957,652 | 9/1990 | Tamura et al. | 252/67 |
| 4,961,321 | 10/1990 | O'Neill et al. | 62/114 |
| 4,983,312 | 1/1991 | Tamura et al. | 252/67 |
| 4,985,168 | 1/1991 | Ohmure et al. | 252/67 |
| 4,996,242 | 2/1991 | Lin | 521/131 |
| 5,001,164 | 3/1991 | Smits et al. | 521/131 |
| 5,064,559 | 11/1991 | Merchant et al. | 252/67 |
| 5,076,064 | 12/1991 | Kopko | 62/77 |
| 5,087,381 | 2/1992 | Tamura et al. | 252/67 |
| 5,093,378 | 3/1992 | Ishikawa | 521/128 |
| 5,102,557 | 4/1992 | Nimitz et al. | 252/8 |
| 5,105,034 | 4/1992 | Tonelli et al. | 570/173 |
| 5,135,054 | 8/1992 | Nimitz et al. | 169/46 |

(List continued on next page.)

FOREIGN PATENT DOCUMENTS 4323294  11/1992  Japan.

OTHER PUBLICATIONS

Chemical Abstract No. 64–12182d (1966).

Heinz Weber, "Foamed Plastics", Ullman's Encyclopedia of Industrial Chemistry, vol. A11, pp. 435–463, Verla, 1984.

Siegrfried Haff et al., "Refrigeration Technology", Ullman's Encyclopedia Industrial Chemistry, vol. B3, Ch. 19, pp. 19–1 to 19–39, 1988.

Ronald S. Sheinson et al., "The Physical and Chemical Action of Fire Suppressants", Fire Safety Journal, vol. 15, pp. 437–450, 1989.

Chapman and Hall "Dictionary of Organic Compounds", Fifth Edition, Volume Five, New York London Toronto, 1982.

Kopko, "Beyond CFCs:Extending the Search For New Refrigerants", Int. J. Refrig., vol. 13, Mar. 1990, pp. 79–85.

Ronald S. Shienson "Halon Alternatives Extinguishment Pathway Proceedings of the Halon Alternatives Technology Working Conference", University of New Mexico, Albuquerque, NM, Apr. 30 to May 1, 1991, pp. 71–82.

Jonathan S. Nimitz et al., "Next–Generation High–Efficiency Halon Alternatives", Proceedings of the International CFC and Halon Alternatives Conference, Baltimore, Maryland, 3–5 Dec. 1991, pp. 1–9.

Robert E. Tapscott, "Replacement Agents—A Historical Overview", Proceedings of the Halon Alternatives Technical Working Conference 1992, University of New Mexico, Albuquerque, New Mexico, May 12–14, 1992, pp. 58–69.

Everett W. Heinonen et al, "Fire Suppression and Inertion Testing of Halon 1301 Replacement Agents", Proceedings of the Halon Alternatives Technical Working Conference 1992, University of New Mexico, Albuquerque, New Mexico, May 12–14, pp. 213–224.

L.R. Grzyll et al., "An Innovative Approach For the Screening and Development of Halon Alternatives", Proceedings of the 1992 International CFC and Halon Alternatives Conference, Sep. 29–Oct. 1, 1992, Washington, D.C. pp. 647–656.

Primary Examiner—Joseph D. Anthony
Attorney, Agent, or Firm—Dinsmore & Shohl LLP

[57] ABSTRACT

A new set of effective, environmentally safe, nonflammable, low-toxicity refrigerants, solvents, foam blowing agents, propellants, and firefighting agents is disclosed. The agents are clean, electrically nonconductive, and have short atmospheric lifetimes, zero ozone-depletion potential, and low global warming potentials. The agents comprise at least one fluoroiodocarbon agent satisfying the general formula $C_aH_bBr_cCl_dF_eI_fN_gO_h$, wherein a is between and including 1 and 8; b is between and including 0 and 2; c, d, g, and h are each between and including 0 and 1; e is between and including 1 and 18; and f is between and including 1 and 2, either neat or mixed with additives selected from the group consisting of: alcohols, esters, ethers, fluoroethers, hydrocarbons, hydrofluorocarbons, and perfluorocarbons.

40 Claims, No Drawings

U.S. PATENT DOCUMENTS

| | | | |
|---|---|---|---|
| 5,147,896 | 9/1992 | York | 521/79 |
| 5,182,040 | 1/1993 | Bartlett et al. | 252/67 |
| 5,188,748 | 2/1993 | Arnaud et al. | 252/67 |
| 5,194,169 | 3/1993 | Felix | 252/67 |
| 5,199,859 | 4/1993 | Kitaichi | 417/410.1 |
| 5,204,169 | 4/1993 | York | 428/220 |
| 5,276,194 | 1/1994 | May | 564/409 |
| 5,382,723 | 1/1995 | Durual et al. | 570/176 |
| 5,406,008 | 4/1995 | Sievert | 570/123 |

FLUOROIODOCARBON BLENDS AS CFC AND HALON REPLACEMENTS

RELATED U.S. APPLICATION DATA

This application is a continuation of application Ser. No. 08/027,227 filed Mar. 5, 1993 now U.S. Pat. No. 5,611,210.

A related application entitled "Clean Tropodegradable Fire Extinguishing Agents with Low Ozone Depletion and Global Warming Potentials," application Ser. No. 07/800,532 was filed by Nimitz et al. on Nov. 27, 1991.

GOVERNMENT RIGHTS

The U.S. Government is granted an irrevocable, non-exclusive, nontransferable, royalty-free fight to use the invention with the authority to grant said right for governmental purposes.

BACKGROUND OF THE INVENTION

1. Field of the Invention (Technical Field)

The invention disclosed herein generally relates to fluoroiodocarbon compositions of matter, and methods of making and using such compositions of matter.

2. Background Art

Chlorofluorocarbons (CFCs) such as CFC-11, CFC-12, CFC-113, CFC-114, CFC-115, and blends containing these CFCs such as R-500 and R-502 are currently used as refrigerants, solvents, foam blowing agents, and propellants. CFCs contain only chlorine, fluorine, and carbon, and have the general formula $C_xCl_yF_z$, where X=1 or 2 and Y+Z= 2X+2. A related group of chemicals known as halons (also called bromofluorocarbons, BFCs), having the general formula $C_wBr_xCl_yF_z$ (where W=1 or 2, Y=0 or 1, and X+Y+Z=2W+2) are in current use as firefighting agents.

Because of the great chemical stability of CFCs and halons, when they are released to the atmosphere only minuscule fractions are destroyed by natural processes in the troposphere. As a result, CFCs and halons have long atmospheric lifetimes and migrate to the stratosphere where they undergo photolysis, forming chlorine and bromine radicals that seriously deplete the earth's protective ozone layer. Each chemical is assigned an ozone-depletion potential (ODP) that reflects its quantitative ability to destroy stratospheric ozone. The ozone depletion potential is calculated in each case relative to CFC-11 ($CFCl_3$, trichlorofluoromethane), which has been assigned a value of 1.0. Currently used CFCs have ODPs near 1; halons have ODPs between 2 and 14. Names, formulas, and ODPs of commonly used CFCs and halons are shown in Table 1.

TABLE 1

NAMES, FORMULAS, AND ODPs OF CFCS IN CURRENT USE AS REFRIGERANTS, SOLVENTS, FOAM BLOWING AGENTS, AND PROPELLANTS

| CFC or Halon | Name | Formula | ODP |
|---|---|---|---|
| CFC-11 | trichlorofluoromethane | $CCl_3F$ | 1.0 |
| CFC-12 | dichlorodifluoromethane | $CCl_2F_2$ | 1.0 |
| CFC-113 | 1,1,2-trichloro-1,2,2-trifluoroethane | $CCl_2FCClF_2$ | 1.1 |
| CFC-114 | 1,2-dichloro-1,1,2,2-tetrafluoroethane | $CClF_2CClF_2$ | 0.8 |
| CFC-115 | chloropentafluoroethane | $CClF_2CF_3$ | 0.5 |
| R-500 | —[a] | — | 0.3 |
| R-502 | —[b] | — | 0.7 |
| Halon 1211 | bromochlorodifluoromethane | $CBrClF_2$ | 4.1 |

TABLE 1-continued

NAMES, FORMULAS, AND ODPs OF CFCS IN CURRENT USE AS REFRIGERANTS, SOLVENTS, FOAM BLOWING AGENTS, AND PROPELLANTS

| CFC or Halon | Name | Formula | ODP |
|---|---|---|---|
| Halon 1301 | bromotrifluoromethane | $CBrF_3$ | 12.5 |
| Halon 2402 | 1,2-dibromotetrafluoroethane | $CBrF_2CBrF_2$ | 3.9 |

[a]azeotropic blend of $CCl_2F_2$ (CFC-12, 73.8 wt. %) and $CHF_2CF_3$ (HFC-125, 26.2 wt. %).
[b]azeotropic blend of $CClF_2CF_3$ (CFC-115, 51.2 wt. %) and $CHClF_2$ (HCFC-22, 48.8 wt. %).

CFC-12, for example, comprises approximately 26% by weight of worldwide CFC production, and about 150 million pounds per year are produced. The vast majority of this CFC-12 is eventually released to the atmosphere, where it rises to the stratosphere, is struck by ultraviolet radiation, and decomposes to give chlorine radicals that catalytically destroy the protective ozone layer of the earth. This depletion of stratospheric ozone allows more ultraviolet light to reach the surface of the earth, resulting in increases in human skin cancer and cataracts plus damage to crops, natural ecosystems, and materials, in addition to other adverse effects. This invention will significantly decrease these adverse effects by providing environmentally safe alternative agents to use in place of CFCs and halons.

At present, CFCs, in addition to selected hydrochlorofluorocarbons (HCFCs) and hydrofluorocarbons (HFCs) are used as refrigerants, solvents, foam blowing agents, and propellants. CFCs have been widely used for these applications because of their effectiveness, low toxicity, nonflammability, electrical nonconductivity, cleanliness on evaporation, miscibility with hydrocarbon and mineral oil lubricants, and relative nonreactivity towards copper, aluminum, and ferrous metals. However, CFCs are being phased out of production in the U.S. under the provisions of the Montreal Protocol, the Clean Air Act Amendments of 1990, and the presidential directive of 11 Feb., 1992. Although HCFCs (with ODPs ranging from 0.02 to 0.11) deplete ozone much less than CFCs, HCFCs do cause some ozone depletion and are also scheduled to be phased out of production eventually under the Montreal Protocol.

The broad class of halocarbons consists of all molecules that contain carbon, may contain hydrogen, and contain at least one of the following halogen atoms: fluorine, chlorine, bromine, or iodine. Iodocarbons are halocarbons that contain iodine; fluoroiodocarbons contain both fluorine and iodine. Haloalkanes are a subset of halocarbons comprising compounds made up of only carbon, halogens, and possibly hydrogen, and having no oxygen, nitrogen, or multiple bonds. In principle, haloalkanes may be derived from hydrocarbons by substitution of halogen atoms (F, Cl, Br, or I) for hydrogen atoms. Hydrocarbons themselves have been used as very effective refrigerants, solvents, foam blowing agents, and propellants but have the major disadvantage of extremely high flammability. Substitution with a high proportion of halogen atoms imparts nonflammability. CFCs and other highly halogenated halocarbons therefore possess many of the desirable properties of hydrocarbons plus the substantial advantage of nonflammability.

Toxicity is a major issue in the selection of refrigerants, solvents, foam blowing agents, propellants, and firefighting agents. For example, the toxic effects of haloalkanes include stimulation or suppression of the central nervous system, initiation of cardiac arrythmias, and sensitization of the heart to adrenaline. Inhalation of haloalkanes can cause bronchoconstriction, reduce pulmonary compliance, depress respiratory volume, reduce mean arterial blood pressure, and produce tachycardia. Long term effects can include hepatotoxicity, mutagenesis, teratogenesis, and carcinogenicity.

Environmental effects of halocarbons including ozone-depletion potential (ODP), global warming potential (GWP), and terrestrial impacts must be considered. Chlorine- and bromine-containing haloalkanes are known to deplete stratospheric ozone, with bromine posing a greater problem (per atom) than chlorine. The depletion of ozone in the stratosphere results in increased levels of ultraviolet radiation at the surface of the earth, causing increased incidences of skin cancer, cataracts, suppression of human immune systems, crop damage, and damage to aquatic organisms. These problems are considered so serious that the Montreal Protocol and other legislation have placed restrictions on the production and use of volatile halogenated alkanes.

Flame suppression occurs by two mechanisms: physical and chemical. The physical mechanism involves heat absorption by the molecules sufficient to lower the temperature of the combusting materials below the ignition point and/or displacement of oxygen thereby terminating combustion. The larger the extinguishant molecule (the more atoms and bonds it contains) the more degrees of vibrational freedom it has, the higher the vapor heat capacity, and the greater the heat removal. The chemical mechanism involves interruption of free radical flame-propagation chain reactions involving hydrogen, oxygen, and hydroxyl radicals. It has been speculated (but not proven) that bromine atoms disrupt these chain reactions.

Previous firefighting agents utilized either chemical or physical action or both to achieve flame extinguishment. Agents such as carbon dioxide displace oxygen and also absorb thermal energy. Agents such as water function solely by thermal energy absorption. Previous halogenated agents such as carbon tetrachloride, bromotrifluoromethane, etc. employ both functional means. U.S. Army studies on halogenated agents in the 1940's resulted in the adoption of the well known Halon family of agents. Other work by New Mexico Engineering Research Institute has identified neat perfluorocarbons and some neat iodinated agents as having future potential as firefighting agents (Nimitz et al., "Clean Tropodegradable Fire Extinguishing Agents with Low Ozone Depletion and Global Warming Potentials," co-pending U.S. patent application Ser. No. 07/800,532 filed by Nimitz et al. on Nov. 27, 1991). In this work a few iodine-containing chemicals in neat form were shown to exhibit similar extinguishment properties to bromine-containing chemicals.

There are many concerns regarding brominated, perfluorinated, and neat iodinated agents. Brominated agents are presently being eliminated from worldwide production, pursuant to the adoption of the Montreal Protocol and the Clean Air Act of 1990, due to their tremendous potential to destroy the stratospheric ozone layer. Perfluorinated agents have high global warming potential and atmospheric lifetimes estimated to be several thousand years. Their production and use is being restricted by pending legislation and liability concerns of current manufacturers. The costs of perfluorocarbons are high and their firefighting performance is less than that of the brominated agents. In weight and volume critical situations such as aircraft, tanks, and ships, the additional quantity required for extinguishment cannot be tolerated. One neat iodinated agent (trifluoroiodomethane, $CF_3I$) has long been known to have firefighting potential (*Dictionary Of Organic Compounds*, Chapman and Hall, New York, 1982, p. 5477). Concerns about $CF_3I$ revolve around toxicity and dispersion effectiveness. Bromotrifluoromethane ($CF_3Br$) was the choice agent for such gaseous flooding applications and has remained so until the present time.

Refrigerants, solvents, foam blowing agents, propellants, and firefighting agents must be chemically stable during storage and use over long periods of time and must be unreactive with the containment systems in which they are housed. Refrigerants normally operate between the temperature extremes of $-98°$ C. to $8°$ C. The majority of residential, commercial, and institutional applications lie in the range of $-23°$ C. to $8°$ C. In extraordinary cases (e.g., motor burnout) higher temperatures may be experienced, but in such cases the formation of other contaminants would make replacement of the fluid necessary anyway. Although solvents, foam blowing agents, and propellants are normally stored and used at room temperature, they may under unusual circumstances experience transient temperatures up to $150°$ C. during storage. Firefighting agents must be stable on storage at temperatures of $-20°$ C. to $50°$ C., and should decompose at flame temperatures to yield radical-trapping species.

A refrigerant operates by absorbing heat as it evaporates in one region of the apparatus, then gives up the heat as it recondenses in another portion of the apparatus. The required properties for effectiveness include appropriate vapor pressure curves, enthalpies of vaporization, solubility behavior (including oil miscibility), toxicity, and flammability. CFCs 12, 114, 500, and 502 have been used as refrigerants for many years because they possess the required physical properties such as appropriate boiling points and operating pressures, enthalpies of vaporization, miscibility with mineral oil-based lubricants, low toxicity and nonflammability. In addition, CFCs are relatively noncorrosive to metals and seal materials. Properties of commonly used refrigerants (including typical evaporator and condenser temperatures and typical usages) are set forth in Table 2.

TABLE 2

| | | | |
|---|---|---|---|
| TYPICAL EVAPORATOR AND CONDENSER TEMPERATURES FOR CFC REFRIGERANTS | | | |
| CFC | Evap. Temp (F.°) | Cond. Temp (F.°) | Typical Usages |
| 11 | 35 to 40 | 95 to 105 | Centrifugal chillers, solvent, foam agent |
| 12 | −10 to 35 | 105 to 125 | Auto A/C, freezers, window A/C units |
| 13 | −50 to −75 | 100 to 125 | Very low temp freezers |
| 113 | 35 to 40 | 95 to 105 | Centrifiigal chillers, solvent, cleaner |
| 114 | −24 to 35 | 100 to 125 | Marine chillers, low temp freezers |
| 115 | −50 | 100 to 125 | Low temp freezers |
| 500 | −30 to −80 | 100 to 125 | Supermarket cases, vending machines, commercial transport |
| 502 | −40 to −100 | 100 to 125 | Low temp refrigeration |
| 503 | −100 to −200 | 100 to 125 | Cryogenic freezers |

Hydrocarbons including cyclopropane, propane, butane, and isobutane have also been used as highly effective refrigerants. However, hydrocarbons have found little commercial use as refrigerants because of their high flammability. They possess all of the other required properties The ASHRAE Standard 15 limits the use of most hydrocarbons as Class 2 or 3 refrigerants, limiting their use to laboratory equipment with a total charge of less than 3 pounds or to technical/industrial applications wherein the refrigeration equipment is located remotely from inhabited buildings. These restrictions severely limit the current utility of refrigerants containing hydrocarbons.

Refrigeration equipment requires lubricant constantly circulating in the refrigerant fluid to avoid friction, overheating, and burnout of the compressor or bearings. Therefore miscibility of refrigerants with lubricants is an essential requirement. For example, most lubricants are not very soluble in hydrofluorocarbons (HFCs), and this has presented major problems in the use of the alternative agent HFC-134a for refrigeration.

Many billions of dollars worth of instilled refrigeration and air-conditioning equipment currently exists. If CFCs become unavailable and no drop-in replacements are available, much of this equipment will be rendered inoperable and may wind up in landfills. The useful lifetime will be shortened drastically, and a significant fraction of the energy and resources put into manufacturing and installing the equipment will be wasted.

A solvent must dissolve hydrophobic soils such as oils, greases, and waxes, should be nonflammable and relatively nontoxic, and should evaporate cleanly. For solvents, chemicals with boiling points between 35° C. and 120° C. are preferred, because this boiling point range allows evaporation in reasonable time (between one minute and two hours). Traditionally, CFC-113 and 1,1,1-trichloroethane have been solvents of choice. Recently, because of environmental concerns about halogenated solvents, interest in hydrocarbon solvents such as Stoddard solvent (a petroleum fraction of eight- to eleven-carbon hydrocarbons) has revived, despite the flammability of these solvents. When referring to hydrocarbon petroleum fractions, it is commonly understood that the terms ligroin, mineral spirits, naphtha, petroleum ether, and petroleum spirits may represent fractions with similar compositions and may at times be used interchangeably.

A foam blowing agent must create uniform, controllable cell size in a polymer matrix, and preferably should provide high insulation value and be nonflammable. For foam blowing a wide variety of agents has been used, including CFC-11, HCFC-22, HCFC-123, HFC-134a, HCFC-141b, and pentane. Water is often added in the foam blowing agent (up to about 25% by moles) to react with the forming polymer, liberating carbon dioxide and aiding cell formation. More recently, some manufacturers have shifted to using water as the exclusive blowing agent, despite slight losses in insulating ability, dimensional stability, and resistance to aging.

An aerosol propellant must have a high vapor pressure, low heat of vaporization, and stability on storage. In the U.S., CFCs were used as propellants until 1978, and in many countries CFCs are still in use for this purpose. The continued use of CFC aerosol propellants overseas contributes substantially to stratospheric ozone depletion. After 1978 in the U.S. CFCs were replaced by the hydrocarbons butane and isobutane for many propellant applications. These gases are extremely flammable and people have been burned in fires involving these propellants.

Firefighting agents to replace halons must be effective extinguishants, relatively nontoxic, electrically nonconductive, must evaporate cleanly, and must have low environmental impact. Halons (bromofluorocarbons), although they meet the first four criteria, have long atmospheric lifetimes and high ozone-depletion potentials, and will be phased out of production under the terms of the Montreal Protocol and other regulations.

Although it is relatively easy to identify chemicals having one, two, or three selected properties, it is very difficult to identify chemicals that possess simultaneously all of the following properties: effective performance, nonflammability, low toxicity, cleanliness, electrical nonconductivity, miscibility with common lubricants, short atmospheric and environmental lifetimes, zero ODP, and very low GWP. Furthermore, the unusual and desirable properties of selected members of the obscure class of fluoroiodocarbons are by no means obvious. Fluoroiodocarbons have only rarely been studied, and very few of their properties are reported in the literature. Conventional chemical wisdom indicates that iodine-containing organic compounds are too toxic and unstable to use for these purposes, and iodocarbons have been rejected on those grounds by the majority of those skilled in the art. Partly as a result of this prejudice, the properties of the class of fluoroiodocarbons have been investigated only slightly, and fluoroiodocarbons have remained a little-known class of chemicals.

An important part of this invention is recognizing that the unique properties of fluorine (the most electronegative element) strengthen and stabilize a carbon-to-iodine bond sufficiently to render selected fluoroiodocarbons relatively nontoxic and stable enough for use in solvent cleaning, refrigeration, foam blowing, and aerosol propulsion. Painstaking collection and estimation of properties and screening for expected effectiveness, low toxicity, and low environmental impact have been carried out to identify them as being suitable for these new uses. Disclosed herein therefore are both new uses and new combinations of chemicals, leading to new and unexpected results.

Both the neat and blended fluoroiodocarbons described herein provide new, environmentally safe, nonflammable refrigerants, solvents, foam blowing agents, aerosol propellants, and firefighting agents. These compounds have the characteristics of excellent performance, cleanliness, electrical nonconductivity, low toxicity, nonflammability (self-extinguishment), short atmospheric lifetime, zero ODP, low GWP, and negligible terrestrial environmental impact.

Although some fluoroiodocarbons are described briefly in the known chemical literature, their potential for the uses described herein has never been previously recognized. No fluoroiodocarbons have been used before for solvent cleaning, refrigeration, foam blowing, or aerosol propulsion, either in neat form or in blends. One neat fluoroiodocarbon ($CF_3I$) has been briefly described as a firefighting agent in the open literature (*Dictionary of Organic Compounds*, Chapman and Hall, New York, 1982, p. 5477). A small number of additional neat fluoroiodocarbons has been proposed by one of the current inventors for use in firefighting (Nimitz et al., "Clean Tropodegradable Fire Extinguishing Agents with Low Ozone Depletion and Global Warming Potentials," co-pending U.S. patent application Ser. No. 07/800,532, filed Nov. 27, 1991). However, neither any blends containing fluoroiodocarbons nor the new neat fluoroiodocarbon agents described herein have ever before been proposed for use in firefighting or any of the other uses described herein. These blends and new neat agents offer substantial advantages in terms of lower cost, lower toxicity, improved physical properties, and greater effectiveness.

SUMMARY OF THE INVENTION (Disclosure of the Invention)

A primary object of the invention is the provision of relatively nontoxic agents for use in refrigeration, solvent cleaning, foam blowing, aerosol propulsion, and firefighting. Another object of the invention is the provision of nonflammable and environmentally safe compositions of matter. Yet another object of the invention is the provision of fluoroiodocarbon compounds that are clean and electrically nonconductive. Still another object of the invention is the provision of neat and blended fluoroiodocarbons having zero ozone-depletion potential, low global warming potential, and negligible atmospheric and terrestrial environmental impacts.

An advantage of the invention is the duplication of existing refrigerants, solvents, foam blowing agents, aerosol propellants, and firefighting agents at lower cost. Another advantage of the invention is optimization of properties by blending of fluoroiodocarbons with selected additives. Still another advantage of the invention is the provision of effective and, in some cases, superior compositions of fluoroiodocarbons as replacements for existing chemical compounds.

DESCRIPTION OF THE PREFERRED EMBODIMENTS (Best Modes for Carrying Out the Invention)

Desirable agents must possess all of the following properties: effectiveness, low toxicity, nonflammability, and environmental safety. Although it is relatively to easy find chemicals that meet two or three of these criteria, it is extremely difficult to identify chemicals that meet all desired criteria. The novelty of this invention lies in identifying chemical compounds and blends (and methods of using these) that meet all these criteria. The chemical compounds and blends described herein are effective, relatively nontoxic, nonflammable, and environmentally benign. They have the desired boiling points, vapor pressures, and heats of vaporization for optimal effectiveness. By mixing a fluoroiodocarbon with another chemical several major advantages are obtained. First, and perhaps most importantly, the mixture is rendered completely nonflammable. Second, by appropriate blending of chemicals, the physical properties (including boiling range, density, viscosity, and lubricant solubility) can be optimized to obtain maximum performance. Third, the already low toxicity can be further reduced. Fourth, the cost of the agent is reduced.

As a general class, iodocarbons are more reactive, less stable, and more toxic than the corresponding chloro- or bromocarbons; for this reason they have often been rejected as unsuitable for the applications described here. However, an important part of this invention is recognizing the fact that the unique properties of fluorine give polyfluorinated iodocarbons exceptionally low reactivity, high stability, and low toxicity. Because fluorine is the most electronegative element, the presence of two or more fluorine atoms attached to the same carbon atom which is bonded to the iodine atom withdraws electron density and provides steric hindrance, making the carbon-to-iodine bonds in fluoroiodocarbons abnormally strong and resistant to chemical reaction. All of the three common mechanisms of chemical reaction are inhibited in fluoroiodocarbons: unimolecular nucleophilic substitution ($S_N1$), bimolecular nucleophilic substitution ($S_N2$), and homolytic bond cleavage. Because of this low reactivity, fluoroiodocarbons exhibit unusually high stability and low toxicity. In addition, iodocarbons have never been implicated in ozone depletion, global warming, or long-term terrestrial environmental contamination.

In applying the selection criteria of the invention, with regard to toxicity, each of the preferred compounds is characterized by acute toxicity (either measured or predicted) no greater than that of currently used CFCs. In this regard, toxicity is measured as $LC_{50}$ (lethal concentration at the fifty percent level) for rats over an exposure period of 4 hours. Toxicity data on fluoroiodocarbons is limited at this time but highly encouraging. All of the following fluoroiodocarbons are reported to have mice 1-hour $LC_{50}$s of greater than 10,000 ppm: 1-iodoperfluoroethane, 1-iodo-perfluorobutane, and 1-iodoperfluorohexane.

If a chemical is to have zero ODP it must either (1) not contain chlorine nor bromine, or (2) undergo rapid and complete destruction by natural processes in the troposphere (and thus never reach the stratosphere). The three major mechanisms for destruction of halocarbons in the troposphere are photolysis, attack by hydroxyl radical (OH), and attack by oxygen atoms (O). In the troposphere, because of shielding by stratospheric ozone and other atmospheric components, the sunlight present is of longer wavelength (and correspondingly lower energy) than the light present in the stratosphere. If molecules are to be photolyzed in the troposphere they must contain light-absorbing groups (chromophores) and weak bonds. Such light-absorbing groups with weak bonds include carbon-to-iodine sigma bonds. Carbon-to-iodine bonds are extremely sensitive to photolysis and cleave easily in the presence of sunlight, even at ground level. Thus, fluoroiodocarbons are destroyed rapidly by photolysis in the troposphere and thus do not contribute to ozone depletion or substantially to global warming.

The compounds of the present invention are also selected on the basis of their global warming potentials, which are increasingly being considered along with ozone depletion factors. Global warming is caused by absorption by molecules in the atmosphere of infrared radiation leaving the surface of the earth. The longer the atmospheric lifetime and the greater the infrared absorption of a molecule, the greater its GWP. It is recognized that some chlorofluorocarbons have GWPs several thousand times that of carbon dioxide. Because of their rapid photolysis and resulting short atmospheric lifetimes, fluoroiodocarbons have greatly reduced GWPs compared to CFCs, halons, HCFCs, HFCs, and perfluorocarbons.

The short atmospheric lifetimes of fluoroiodocarbons are due to the preferential absorption of ultraviolet energy by the carbon-to-iodine bond, causing the agent to decompose in natural sunlight within a short period after it enters the atmosphere. Decomposition byproducts are harmless salts which are cleansed from the environment by natural precipitation. A fluoroiodocarbon may even contain a chlorine or bromine atom without causing measurable stratospheric ozone depletion because the molecule will be destroyed by photolysis of the C—I bond in the troposphere, never reaching the stratosphere.

In addition to undergoing rapid photolysis, iodoalkanes undergo faster hydrolysis than the corresponding chloro- or bromoalkanes; thus they degrade rapidly in natural waterways to form harmless products such as potassium iodide (a common additive to table salt). Because of this rapid degradation, fluoroiodocarbons (in contrast to CFCs) have never been implicated in long-term soil or ground water contamination.

Fluoroiodocarbons are highly effective flame suppression agents, in some cases more effective on a per-mole basis than halons (bromofluorocarbons). Fluoroiodocarbons not only provide chemical extinguishment, but significant physical extinguishment through heat removal by molecular vibrations. Addition of a sufficient concentration of a fluoroiodocarbon to an otherwise flammable liquid or vapor (such as a hydrocarbon) renders the material self-extinguishing. The invention described and claimed herein is specifically related to liquid and gaseous chemical agents used to extinguish active and near active fires involving combustible, flammable, and electrically energized materials.

The agents described herein have acceptable stability on storage under normal conditions. To prevent photolysis of the fluoroiodocarbons, they should be protected from sunlight by storage in opaque containers such as metal cylinders or brown glass bottles. If desired, for long-term storage a small amount of copper metal can be added to enhance the stability of the iodides.

The preferred fluoroiodocarbons meeting the selection criteria are set forth in Table 3 below. All the fluoroiodocarbon agents have boiling points between $-25°$ C. and $+170°$ C. and satisfy the general chemical formula $C_aH_bBr_cCl_dF_eI_fN_gO_h$, wherein a is between and including 1 and 8; b is between and including 0 and 2; c, d, g, and h are each between and including 0 and 1; e is between and including 1 and 17; and f is between and including 1 and 2.

TABLE 3

PREFERRED FLUOROIODOCARBON AGENTS

| Name(s) | Formula |
|---|---|
| bromodifluoroiodomethane | $CBrF_2I$ |
| chlorodifluoroiodomethane | $CClF_2I$ |
| 1,1,2,2,3,3,4,4,5,5-decafluoro-1,5-diiodopentane, 1,5-diiodoperfluoropentane | $I(CF_2)_5I$ |
| difluorodiiodomethane | $CF_2I_2$ |
| difluoroiodomethane | $CHF_2I$ |
| 1,1,2,2,3,3,4,4,5,5,6,6-dodecafluoro-1,6-diiodohexane, 1,6-diiodoperfluorohexane | $I(CF_2)_6I$ |
| fluoroiodomethane | $CH_2FI$ |
| 1,1,1,2,3,3,3-heptafluoro-2-iodopropane, perfluoroisopropyl iodide | $CF_3CFICF_3$ |
| 1,1,2,2,3,3,3-heptafluoro-1-iodopropane, perfluoropropyl iodide | $CF_3CF_2CF_2I$ |
| 1,1,2,2,3,3-hexafluoro-1,3-diiodopropane, 1,3-diiodoperfluoropropane | $I(CF_2)_3I$ |
| 1-iodoheptadecafluorooctane, 1-iodoperfluorooctane, perfluorooctyl iodide | $CF_3(CF_2)_7I$ |
| iodoheptafluorocyclobutane, iodoperfluorocyclobutane | cyclo-$(CF_2)_3CFI$ |
| 1-iodopentadecafluoroheptane, 1-iodoperfluoroheptane, perfluoroheptyl iodide | $CF_3(CF_2)_6I$ |
| iodopentafluorobenzene | $C_6F_5I$ |
| iodopentafluorocyclopropane, iodoperfluorocyclopropane, perfluorocyclopropyl iodide | $CF_2CF_2CFI$ |
| 1-iodotridecafluorohexane, 1-iodoperfluorohexane, perfluorohexyl iodide | $CF_3(CF_2)_5I$ |
| 1-odoundecafluoropentane, 1-iodoperfluoropentane, perfluoropentyl iodide | $CF_3(CF_2)_4I$ |
| N-iodobis-(trifluoromethyl)amine | $(CF_3)_2NI$ |
| 1,1,2,2,3,3,4,4,4-nonafluoro-1-iodobutane, 1-iodoperfluorobutane,perfluorobutyl iodide | $CF_3(CF_2)_3I$ |
| 1,1,2,2,3,3,4,4-octafluoro-1,4-diiodobutane, 1,4-diiodoperfluorobutane | $I(CF_2)_4I$ |
| pentafluoroiodoethane, perfluoroethyl iodide | $CF_3CF_2I$ |
| 1,1,2,2-tetrafluoro-1,2-diiodoethane, 1,2-diiodoperfluoroethane | $CF_2ICF_2I$ |
| 1,1,2,2-tetrafluoro-1-iodoethane | $CF_2ICHF_2$ |
| 1,1,2-trifluoro-1 -iodoethane | $CF_2ICH_2F$ |
| trifluoroiodomethane, trifluoromethyl iodide | $CF_3I$ |
| trifluoromethyl-1,1,2,2-tetrafluoro-2-iodoethyl ether | $CF_3OCF_2CF_2I$ |

Preferred additives for blending with fluoroiodocarbons are shown in Table 4. Table 4 includes selected alcohols, esters, ethers, hydrocarbons, hydrofluorocarbons, fluoroethers, ketones, and perfluorocarbons with boiling points between $-150°$ C. and $+200°$ C.

Azeotropic-blends are particularly preferred because they do not change composition on evaporation and thus do not change properties if part of the mixture evaporates. We have developed a proprietary computer program for predicting azeotrope formation based on the Soave-Redlich-Kwong equation of state and have screened the fluoroiodocarbon blends described herein to identify likely azeotropes. This program also incorporates novel methods we have developed for estimating properties of chemicals and blends: it provides accurate estimates of vapor pressure curves, enthalpies of vaporization, and other properties of interest, allowing selection of optimal blends.

TABLE 4

PREFERRED ADDITIVES TO BE BLENDED WITH FLUOROIODOCARBONS

| Class | Name(s) | Formula |
|---|---|---|
| alcohol | 1-butanol | $HO(CH_2)_3CH_3$ |
| | 2-butanol | $CH_3CH(OH)CH_2CH_3$ |
| | ethanol | $CH_3CH_2OH$ |
| | methanol | $CH_3OH$ |
| | 2-methyl-1-propanol | $HOCH_2CH(CH_3)CH_3$ |
| | 2-methyl-2-propanol | $(CH_3)_3COH$ |
| | 1-pentanol | $CH_3(CH_2)_4OH$ |
| | 2-pentanol | $CH_3CHOHCH_2CH_2CH_3$ |
| | 1-propanol | $HO(CH_2)_2CH_3$ |
| | 2-propanol | $(CH_3)_2CHOH$ |
| ester | ethyl acetate | $CH_3COOCH_2CH_3$ |
| | ethyl butanoate, ethyl butyrate | $CH_3(CH_2)_2COOCH_2CH_3$ |
| | ethyl propanoate, ethyl propionate | $CH_3CH_2COOCH_2CH_3$ |
| | isobutyl acetate | $(CH_3)_2CHCH_2OCOCH_3$ |
| | isopropyl acetate | $CH_3COOCH(CH_3)_2$ |
| | methyl acetate | $CH_3COCCH_3$ |
| | methyl butanoate, methyl butyrate | $CH_3(CH_2)_3COOCH_3$ |
| | methyl propanoate, methyl propionate | $CH_3(CH_2)_2COOCH_3$ |
| | n-butyl acetate | $CH_3(CH_2)_3OCOCH_3$ |
| | hexyl acetate | $CH_3(CH_2)_5OCOCH_3$ |
| | n-pentyl acetate, amyl acetate | $CH_3(CH_2)_4OCOCH_3$ |
| | n-propyl acetate | $CH_3(CH_2)_2OCOCH_3$ |
| | sec-butyl acetate | $CH_3CH_2CH(CH_3)OCOCH_3$ |
| ether | diethyl ether, ethyl ether | $(CH_3CH_2)_2O$ |
| | diisopropyl ether, isopropyl ether | $((CH_3)_2CH)_2O$ |
| | dimethyl ether, methyl ether | $CH_3OCH_3$ |
| | di-n-butyl ether, butyl ether | $(CH_3(CH_2)_3)_2O$ |
| | di-n-propyl ether, propyl ether | $(CH_3CH_2CH_2)_2O$ |
| | 1,4-dioxane | cyclo-$(CH_2CH_2O)_2$ |
| | ethylene oxide, 1,2-epoxyethane | $CH_2OCH_2$ |
| | propylene oxide, 1,2-epoxypropane | $CH_2OCHCH_3$ |
| | tetrahydrofuran | cyclo-$(CH_2)_4O$ |
| fluoroether | bis-difluoromethyl ether | $(CHF_2)_2O$ |
| | hexafluorodimethyl ether, perfluorodimethyl ether | $(CF_3)_2O$ |
| | hexafluorooxetane, perfluorooxetane | cyclo-$(CF_2)_3O$ |
| | methyl trifluoromethyl ether | $CH_3OCF_3$ |
| | octafluorodimethoxymethane | $CF_3OCF_2OCF_3$ |
| | octafluoro-1,3-dioxolane, perfluoro-1,3-dioxolane | $CF_2(OCF_2CF_2)_2$ |
| | pentafluorodimethyl ether | $CHF_2OCF_3$ |
| | 1,1,2',2',2'-pentafluoro methyl ethyl ether | $CHF_2OCH_2CF_3$ |
| | 1-trifluoromethoxy-1,1,2,2-tetrafluoroethane | $CF_3OCF_2CHF_2$ |
| hydrocarbon | butane | $CH_3(CH_2)_2CH_3$ |
| | cyclopropane | $(CH_2)_3$ |
| | decane | $CH_3(CH_2)_8CH_3$ |
| | 2,3-dimethylpentane | $(CH_3)_2CHCH(CH_3)CH_2CH_3$ |
| | 2,4 dimethylpentane | $((CH_3)_2CH)_2CH_2$ |
| | 2,2-dimethylpropane | $(CH_3)_4C$ |
| | heptane | $CH_3(CH_2)_5CH_3$ |
| | hexane | $CH_3(CH_2)_4CH_3$ |
| | isobutane | $CH_3CH(CH_3)_2$ |
| | ligroin | blend of hydrocarbons |
| | limonene | $C_{10}H_{16}$ |
| | 2-methylbutane | $(CH_3)_2CH_2CH_2CH_3$ |
| | 3-methylhexane | $CH_3CH_2CH(CH_3)CH_2CH_2CH_3$ |
| | 3-methylpentane | $CH_3CH_2CH(CH_3)CH_2CH_3$ |
| | naphtha | blend of hydrocarbons |
| | nonane | $CH_3(CH_2)_7CH_3$ |
| | octane | $CH_3(CH_2)_6CH_3$ |
| | pentane | $CH_3(CH_2)_3CH_3$ |
| | petroleum ether | blend of hydrocarbons |
| | petroleum spirit | blend of hydrocarbons |
| | pinene | $C_{10}H_{16}$ |
| | propane | $CH_3CH_2CH_3$ |
| | Stoddard's solvent | blend of C8 to C11 hydrocarbons |
| | toluene | $C_6H_5CH_3$ |
| | turpentine | blend of hydrocarbons |
| | undecane | $CH_3(CH_2)_9CH_3$ |
| hydrofluorocarbon | difluoromethane | $CH_2F_2$ |
| | 1,1-difluoroethane | $CHF_2CH_3$ |
| | 1,1,1,2,3,3,3-heptafluoropropane | $CF_3CHFCF_3$ |
| | pentafluoroethane | $CF_3CHF_2$ |
| | 1,1,2,2,3-pentafluoropropane | $CHF_2CF_2CH_2F$ |
| | 1,1,1,2-tetrafluoroethane | $CF_3CH_2F$ |
| | 1,1,1-trifluoroethane | $CH_3CF_3$ |

TABLE 4-continued

PREFERRED ADDITIVES TO BE BLENDED WITH
FLUOROIODOCARBONS

| Class | Name(s) | Formula |
|---|---|---|
| | trifluoromethane | $CHF_3$ |
| ketone | acetone, propanone, 2-propanone | $CH_3COCH_3$ |
| | 2-butanone, butanone, methyl ethyl ketone | $CH_3COCH_2CH_3$ |
| | carbon dioxide | $CO_2$ |
| | 2-hexanone, methyl butyl ketone | $CH_3COCH_2CH_2CH_2CH_3$ |
| | 3-methyl-2-butanone | $CH_3COCH(CH_3)_2$ |
| | 2-pentanone, methyl propyl ketone | $CH_3COCH_2CH_2CH_3$ |
| perfluorocarbon | decafluorobutane, perfluorobutane | $CF_3(CF_2)_2CF_3$ |
| | dodecafluoropentane, perfluoropentane | $CF_3(CF_2)_3CF_3$ |
| | hexafluorocyclopropane, perfluorocyclopropane | cyclo-$(CF_2)_3$ |
| | hexafluoroethane, perfluoroethane | $CF_3CF_3$ |
| | octafluorocyclobutane, perfluorocyclobutane | cyclo-$(CF_2)_4$ |
| | octafluoropropane, perfluoropropane | $CF_3CF_2CF_3$ |
| | tetradecafluorohexane, perfluorohexane | $CF_3(CF_2)_4CF_3$ |
| | tetrafluoromethane, perfluoromethane | $CF_4$ |

Refrigerants

This invention discloses that by addition of an appropriate fluoroiodocarbon a hydrocarbon is made a more effective heat-transfer fluid and is rendered self-extinguishing. Such mixtures are unique non-flammable hydrocarbon blends.

All the new refrigeration agents described herein including blends are miscible with the four major groups of lubricants: mineral oil, alkylbenzenes, polyol esters (POEs), and polyalkylene glycols (PAGs). The presence of higher-atomic-weight halogen atoms (chlorine, bromine, or iodine) in an agent, because of the polarizability of these atoms, allows miscibility with these lubricants. A further advantage of hydrocarbon-containing refrigerants is that leak detection is greatly simplified compared to CFCs or HFCs.

As shown in Table 5, by appropriate choices of pure agents or blends, drop-in replacements can be formulated to replace CFCs in existing equipment. The agents described herein allow the replacement of thousands of tons of CFCs in existing equipment with environmentally safe, nonflammable, energy-efficient refrigerants. In new systems redesigned to optimize performance for fluoroiodocarbon-containing agents, superior performance will be obtained.

Solvents

Fluoroiodocarbon agents with boiling points in the desirable range for use as solvents include, for example, 1,1,2,3,3,3-heptafluoro-1-iodopropane, 1,1,1,2,3,3,3-heptafluoro-2-iodopropane, fluoroiodomethane, 1,1,2,2-tetrafluoro-1-iodoethane, 1,1,2,2,3,3,4,4,4-nonafluoro-1-iodobutane, difluorodiiodomethane, undecafluoro-1-iodopentane, and tridecafluoro-1-iodohexane. By addition of a fluoroiodocarbon to a flammable solvent such as a hydrocarbon, alcohol, ester, or ketone the solvent is rendered nonflammable. In the case of blends, to prevent loss of the fluoroiodocarbon agent from the blend through evaporation, ideally the fluoroiodocarbon component should either form an azeotrope or have a boiling point equal to or slightly higher than the other component(s).

Foam Blowing Agents

By addition of an appropriate quantity of a fluoroiodocarbon to the foam blowing agent, the foam produced is rendered nonflammable and its insulating abilities are improved.

Aerosol Propellants

By addition of a sufficient quantity of a volatile fluoroiodocarbon a propellant such as propane, butane, or isobutane is rendered nonflammable.

Firefighting Agents

By blending selected fluoroiodocarbons with hydrofluorocarbons, perfluorocarbons, and fluoroethers, agents are obtained that are highly effective, non-ozone-depleting, and have low toxicity and low cost. In some cases these blended agents provide synergism (better extinguishment than predicted linearly) because of the chemical extinguishment of the fluoroiodocarbon and the physical extinguishment of the additive. The vapor pressure, effectiveness, reactivity with storage vessels and delivery systems, weight, cost, and toxicity may all be optimized by creating blends. Blended azeotropic and near-azeotropic fluoroiodocarbon firefighting agents allow reduction in the cost of the delivered agent by taking advantage of their superior extinguishment capabilities and the lower costs of hydrofluorocarbons, perfluorocarbons, and fluoroethers components compared to fluoroiodocarbons. In addition, they form constant- and near-constant composition agents, simplifying handling and making performance more predicable than that of nonazeotropic blends. Such blends retain their composition at all times, do not fractionate into separate components, remain stable, and provide superior performance. Selected blends act as functional alternatives in existing equipment and delivery systems, minimizing the equipment changes required.

Industrial Applicability

This invention is further illustrated by the following non-limiting examples.

Refrigerants

Table 5 shows preferred examples of drop-in replacement refrigeration agents (including blends).

TABLE 5

EXAMPLES OF PREFERRED DROP-IN REPLACEMENT REFRIGERATION AGENTS

| | | Examples of replacements | |
|---|---|---|---|
| Refrigerant | BP (°C.) | Chemical(s) | Approx. Proportions (by moles) |
| 11 | 23.8 | $C_2F_5I/n-C_3H_7I$ | 50:50 |
| | | $n-C_3H_7I$/butane/pentane | 5:40:55 |
| | | $C_2F_5I$/pentane | 50:50 |
| | | $C_2F_5I$/diethyl ether | 50:50 |
| | | $n-C_3H_7I$/butane | 60:40 |
| 12 | −29.8 | $CF_3I$ | neat |
| | | $CF_3I$/propane | 60:40 |
| | | $CF_3I/CF_3CF_2CF_3$ | 50:50 |
| | | $CF_3I/CF_3CF_2CF_3$ | 10:90 (binary azeotrope) |
| | | $CF_3I/CHF_2CH_3$ | 8:92 (binary aceotrope) |
| | | $CF_3I$/cyclobutane | 10:90 (binary azeotrope) |
| | | $CF_3I/CF_3CF_2CF_3/CHF_2CH_3$ | 32:22:46 (ternary azeotrope) |
| | | $CF_3I$/fluoroethane | 55:45 |
| | | $CF_3I$/cyclopropane | 30:70 |
| 22 | 40.8 | $CF_3I$/propane | 5:95 or 10:90 |
| | | $CF_3I/(CF_3)_2O$ | 50:50 |
| | | $CF_3I/CHF_2OCF_3$ | 5:95 |
| | | $CF_3I$/difluoromethane | 40:60 |
| | | $CF_3I$/pentafluoroethane | 30:70 |
| | | $CF_3I$/1,1,1-triuoroethane | 30:70 |
| | | $CF_3I$/perfluoropropane | 30:70 |
| 500 | −33.5 | $CF_3I$/propane | 45:55 |
| | | $CF_3I/(CF_3)_2O$ | 75:25 |
| | | $CF_3I$/pentafluoroethane | 60:46 |
| | | $CF_3I$/perfluoroethane | 60:40 |
| | | $CF_3I$/1,1,1-trifluoroethane | 60:40 |
| | | $CF_3I$/difluoromethane | 70:30 |
| | | $CF_3I$/fluoroethane | 30:70 |
| | | $CF_3I$/perfluoropropane | 20:80 |
| 502 | −45.4 | $CF_3I$/difluoromethane | 20:80 |
| | | $CF_3I/(CF_3)_2O$ | 40:60 |
| | | $CF_3I$/trifluoromethane | 60:40 |
| | | $CF_3I$/pentafluoroethane | 10:90 |
| | | $CF_3I$/1,1,1-trifluoroethane | 10:90 |
| | | $CF_3I$/perfluoroethane | 10:90 |

Solvents

The following preferred pure agents and blends meet the requirements of solvent performance, nonflammability, low toxicity, and low environmental impact: neat 1,1,2,2,3,3,4,4,4-nonafluoro-1-iodobutane; neat undecafluoro-1-iodopentane; neat tridecafluoro-1-iodohexane; 2 to 15% (by moles) 1,1,2,2-tetrafluoro-1-iodoethane with 98 to 85% hexane; 2 to 15% (by moles) 1,1,2,3,3,3-heptafluoro-1-iodopropane with 98 to 85% pentane; 2 to 15% (by moles) 1,1,2,2,3,3,4,4,4-nonafluoro-1-iodobutane with 98 to 85% hexane; 2 to 15% (by moles) tridecafluoro-1-iodohexane plus 98 to 85% octane, nonane, and/or decane; 2 to 15% (by moles) 1,1,2,2,3,3,4,4,4-nonafluoro-1-iodobutane with 98 to 85% of one or more chemicals selected from the group: methanol, ethanol, 2-butanone, 2-propanol, acetone, methyl acetate, ethyl acetate, tetrahydrofuran, and hexane; and 2 to 15% (by moles) undecafluoro-1-iodopentane with 98 to 85% of at least one chemicals selected from the group: heptane, ethanol, 2-propanol, and 2-butanone.

Foam Blowing Agents

The following preferred pure agents and blends meet the requirements for foam blowing agents: neat difluoroiodomethane; neat pentafluoroiodoethane; neat 1,1,2,3,3,3-heptafluoro-1-iodopropane; 2 to 15% (by moles) pentafluoroiodoethane with 98 to 85% butane; 2 to 15% (by moles) difluoroiodomethane with 98 to 85% butane; 2 to 15% (by moles) 1,1,2,3,3,3-heptafluoro-1-iodopropane with 98 to 85% pentane; 2 to 15% (by moles) pentafluoroiodoethane with 98 to 85% pentane; 2 to 15% (by moles) trifluoroiodomethane with 98 to 85% 1,1-difluoroethane; 2 to 15% (by moles) trifluoroiodomethane with 98 to 85% butane; and any of the agents in this list plus up to 40% by weight water.

Aerosol Propellants

The following nonflammable preferred blends meet the requirements for aerosol propellants: 2 to 15% (by moles) trifluoroiodomethane with 98 to 85% of one or more of the chemicals selected from the group: propane, butane, isobutane, carbon dioxide.

Firefighting Agents

The following preferred blends and neat fluoroiodocarbon agents meet the requirements for effective, clean firefighting agents: blends of $CF_3I$ with at least one chemical selected from the group: trifluoromethane, difluoromethane, pentafluoroethane, and 1,1,1,2-tetrafluoroethane; blends of $CF_3CF_2CF_2I$ with at least one chemical selected from the group $CF_3CF_2I$, $CH_2FI$, perfluoropentane, and perfluorohexane; blends of $CF_3CF_2CF_2CF_2I$ with perfluorohexane; and neat chlorofluoroiodomethane.

The following examples show the effectiveness of the agents listed as environmentally safe, nonflammable refrigerants, solvents, foam blowing agents, propellants, and firefighting agents.

EXAMPLE 1

From a household refrigerator the charge of CFC-12 (about 6 to 8 oz) is removed and collected for recycling, reclamation, or destruction in an environmentally sound manner. The refrigerator is then charged from a pressurized bottle through a closed system with an equivalent mass of an azeotropic blend composed of 10% (by moles) $CF_3I$ and 90% cyclobutane. By this process the stratospheric ozone layer has been protected and compliance with international and national environmental regulations has been achieved without harming the performance of the refrigerator, requiring new equipment, or subjecting the service technician or homeowners to flammability or toxicity risks. As additional benefits, if the charge should ever escape accidentally there is no danger from it of flammability, toxicity, or ozone depletion. The stability, low reactivity, and high materials compatibility of the agents allow them to be stored and used for many years. The presence of $CF_3I$ makes it possible to use existing mineral oil lubricants. No adverse reaction of the new chemicals occurs with residual CFC-12 left in the system.

EXAMPLE 2

A large commercial refrigerator is drained of CFC-12, which is collected and recycled, reclaimed, or destroyed in an environmentally sound manner. The refrigerator is charged with a blend of 10% (by moles) trifluoroiodomethane, 20% perfluorodimethyl ether, and 70% butane. The performance is nearly identical to that with CFC-12, the same mineral oil lubricant can be used, and no materials (e.g., gaskets, O-rings, tubing) must be replaced because of material incompatibilities.

EXAMPLE 3

A 200-ton centrifugal chiller is drained of CFC-11 (about 700 pounds) and filled with an equivalent mass of a blend of n-$C_3F_7I$/butane/pentane (5:40:55 by moles). The chiller is re-energized and resumes normal operation without a loss in capacity or increase in energy consumption and without retrofitting motors or seals.

EXAMPLE 4

A vapor degreaser containing CFC-113 or 1,1,1-trichloroethane is drained and the chemical is taken for recycling, reclamation, or destruction. The vapor degreaser is filled with 1,1,2,2,3,3,4,4,4-nonafluoro-1-iodobutane kept at reflux. A printed circuit board having both through-hole and surface-mount components, contaminated during manufacturing with solder flux residue plus other oils and waxes is passed through this Vapor degreaser. The board is thoroughly cleaned, no stratospheric ozone is destroyed, and there is no flammability or toxicity risk.

EXAMPLE 5

Similar to example 4, except that the replacement agent placed in the vapor degreaser is 95% (by moles) octane with 5% tridecafluoro-1-iodohexane.

EXAMPLE 6

The solvents that have been in use in a manufacturing facility for degreasing of metal parts (CFC-113, 1,1,1-trichloroethane, and Stoddard solvent) are removed and recycled, reclaimed, or destroyed in an environmentally acceptable manner. During manufacturing, a metal component is found to be contaminated on the surface with 350 centistoke machining oil and 250,000 centistoke silicone grease. From a squirt bottle in a fume hood the component is rinsed with 1,1,2,2,3,3;4,4,4-nonafluoro-1-iodobutane; wiped with a clean cloth, and allowed to air dry. Within 15 minutes it is dry and the surface is clean and ready for further processing. This cleaning process did not deplete stratospheric ozone or pose a flammability or toxicity risk to the technician or require excessive investment in engineering controls.

EXAMPLE 7

A gyroscope contaminated with MIL-H-5606 hydraulic fluid is placed in an ultrasonic cleaning machine filled with tridecafluoro-1-iodohexane. A crossdraft local exhaust removes any escaping vapors and the bath is subjected to watts/$cm^2$ ultrasonic energy for 5 minutes. The gyroscope is removed, allowed to drain, and hot-air dried. The resulting very clean gyroscope is carefully packaged and sent on for further manufacturing or installation.

EXAMPLE 8

In a dry cleaning operation the perchloroethylene used is removed and recycled or destroyed in an environmentally sound manner. These solvents are replaced with a blend of 5% (by moles) $CF_3(CF_2)_5I$ and 95% petroleum distillate consisting primarily of heptane and octane. The new solvent is effective, nonflammable, and much less toxic than the solvents replaced. Furthermore, it is less damaging to the environment because the risk of ground water contamination by the long-lived species perchloroethylene is eliminated.

EXAMPLE 9

An alkyd enamel paint is formulated using (instead of pure mineral spirits) a blend of 95% (by moles) mineral spirits and 5% 1-iodoperfluorohexane. The addition of the fluoroiodocarbon renders the formulation nonflammable and safer to use.

EXAMPLE 10

An adhesive is formulated using (instead of 1,1,1-trichloroethane) a blend of 95% (by moles) toluene and 5% 1-iodoperfluorohexane. By this change the adhesive is made nonflammable and less harmful to the environment.

EXAMPLE 11

A polyurethane foam is blown using as the blowing agent a mixture of 5% by moles pentafluoroiodoethane with 95% pentane. In contrast to foams blown using CFC-11, during the manufacturing process none of the vapors released cause ozone depletion. In addition, because of the addition of the fluoroiodoalkane, the foam is rendered nonflammable. Finally, at the end of its useful life, when the foam is disposed of, no damage to stratospheric ozone occurs.

EXAMPLE 12

A can of hair spray is pressurized with a mixture of 4% (by moles) $CF_3I$ and 96% butane and/or isobutane. There is no flammability risk; even if the spray can is accidentally discharged over an open flame no ignition occurs. Discharge of the contents of the can causes no damage to stratospheric ozone.

EXAMPLE 13

A spray can of household disinfectant is pressurized with a mixture of 4% $CF_3I$ and 96% carbon dioxide. Because of the use of the fluoroiodocarbon blend as propellant, any flammability risk is eliminated.

EXAMPLE 14

A gas mixture consisting of 5% (by moles) $CF_3I$, 12% ethylene oxide, and 83% nitrogen is used to sterilize bandages, gauze pads, and medical equipment. Because of the addition of the $CF_3I$ as a supplemental propellant, the danger of fire or explosion during the process is eliminated.

EXAMPLE 15

The charge of Halon 1301 is removed from a computer room fire protection system and taken for recycling or destruction. In its place, with minor modifications of the system (such as changes in gaskets, O-rings, and nozzles) is placed a gas mixture consisting of 60% (by moles) $CF_3I$ and 40% $CF_3CH_2F$. In the event of a fire, the new agent rapidly disperses and extinguishes the fire without harming personnel or damaging equipment. No ozone depletion occurs from the emission of the firefighting agent.

EXAMPLE 16

The Halon 1211 in a 150-lb wheeled flightline extinguisher at an airport is removed and taken for recycling or destruction. In its place, with minor modifications to the extinguisher (such as changes in gaskets, O-rings, and nozzles), is put a mixture of 70% (by moles) 1,1,2,2,3,3,3-heptafluoro-1-iodopropane and 30% perflurohexane. In case of fire the liquid agent is manually directed as a stream at the base of the flames and rapidly extinguishes the fire without harming personnel or damaging equipment. No ozone depletion occurs from the emission of the firefighting agent.

EXAMPLE 17

A cylinder containing approximately 1 lb of $CF_3I$ sealed with a lead plug is mounted under the hood of a vehicle. In case of fire, the extinguisher is activated passively as the lead plug melts and the extinguishing agent is automatically discharged, extinguishing the fire and protecting the occupants, vehicle, and contents.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patent, and publications cited above are hereby incorporated by reference.

We claim:

1. A composition comprising a blend of at least one fluoroiodocarbon of the formula $C_aH_bBr_cCl_dF_eI_fN_g$, wherein a is between and including 1 and 3, b is between and including 0 and 2, c, d and g are each between and including 0 and 1, e is between and including 1 and 7, and f is between and including 1 and 2, with at least one additive selected from the group consisting of alcohols selected from the group consisting of 1-butanol, 2-butanol, ethanol, 2-methyl-1-propanol, 2-methyl-2-propanol, 1-pentanol, 2-pentanol, 1-propanol and 2-propanol, esters, hydrocarbons selected from the group consisting of butane, cyclopropane, decane, 2,3-dimethylpentane, 2,4-dimethylpentane, 2,2-dimethylpropane, heptane, isobutane, limonene, 2-methylbutane, 3-methylhexane, 3-methylpentane, nonane, octane, pentane, pinene, propane, turpentine and undecane, ketones, and perfluorocarbons selected from thee group consisting of decafluorobutane, dodecafluoropentane, hexafluorocyclopropane, hexafluoroethane, octafluorocyclobutane, octafluoropropane, tetradecafluorohexane, and tetrafluoromethane, the blend comprising 5 to 75 mol percent of the fluoroiodocarbon and 25 to 95 mol percent of the additive, the composition being nonflammable and electrically nonconductive, the fluoroiodocarbon having an ozone depletion potential less than 0.02 and a global warming potential less than that of chlorofluorocarbons, and the additive and the fluoroiodocarbon being nonreactive in the blend.

2. A composition as defined by claim 1, wherein the fluoroiodocarbon comprises $CF_3CF_2CF_2I$ and the additive comprises at least one component selected from the group consisting of butane and pentane.

3. A composition as defined by claim 1, wherein the fluoroiodocarbon is included in an amount of from 10 mol percent to 70 mol percent.

4. A composition as defined by claim 1, wherein the fluoroiodocarbon is included in an amount of from 20 mol percent to 60 mol percent.

5. A composition as defined by claim 1, wherein the fluoroiodocarbon is included in an amount of from 30 mol percent to 75 mol percent.

6. A composition as defined by claim 1, wherein the fluoroiodocarbon comprises trifluoroiodomethane and is included in an amount of from 20 mol percent to 60 mol percent.

7. A composition as defined by claim 1, wherein the fluoroiodocarbon comprises trifluoroiodomethane and is included in an amount of from 30 mol percent to 75 mol percent.

8. A composition as defined by claim 1, wherein the fluoroiodocarbon comprises trifluoroiodomethane and is included in an mount of from 20 mol percent to 75 mol percent, and the additive comprises a hydrofluorocarbon.

9. A composition as defined by claim 1, wherein the additive comprises a hydrofluorocarbon.

10. A composition as defined by claim 1, wherein the additive comprises propane, butane, pentane, isobutane, cyclopropane or cylcobutane.

11. A composition as defined by claim 1, wherein the fluoroiodocarbon comprises trifluoroiodomethane and the additive comprises a hydrofluorocarbon.

12. A composition as defined by claim 11, wherein the hydrofluorocarbon comprises difluoroethane.

13. A composition comprising a blend of at least one fluoroiodocarbon of the formula $C_aH_bBr_cCl_dF_eI_fN_g$, wherein a is between and including 1 and 8, b is between and including 0 and 2, c, d and g are each between and including 0 and 1, e is between and including 1 and 17, and f is between and including 1 and 2, with at least one additive selected from the group consisting of esters, hydrocarbons selected from the group consisting of butane, cyclopropane, decade, 2,3-dimethylpentane, 2,4-dimethylpentane, 2,2-dimethylpropane, heptane, isobutane, limonene, 2-methylbutane, 3-methylhexane, 3-methylpentane, nonane, octane, pentane, pinene, propane, turpentine and undecane, and perfluorocarbons selected from the group consisting of decafluorobutane, dodecafluoropentane, hexafluorocyclopropane, hexafluoroethane, octafluorocyclobutane, octafluoropropane, tetradecafluorohexane, and tetrafluoromethane, the blend comprising 5 to 75 mol percent of the fluoroiodocarbon and 25 to 95 mol percent of the additive, the composition being nonflammable and electrically nonconductive, the fluoroiodocarbon having an ozone depletion potential less than 0.02 and a global warming potential less than that of chlorofluorocarbons, and the additive and the fluoroiodocarbon being nonreactive in the blend.

14. A composition as defined by claim 13, wherein the fluoroiodocarbon is included in an mount of from 20 mol percent to 60 mol percent.

15. A composition as defined by claim 13, wherein the fluoroiodocarbon is included in an amount of from 30 mol percent to 75 mol percent.

16. A composition comprising a blend of at least one fluoroiodocarbon of the formula $C_aH_bBr_cCl_dF_eI_fN_g$, wherein a is between and including 1 and 8, b is between and including 0 and 2, c, d and g are each between and including 0 and 1, c is between and including 1 and 17, and f is between and including 1 and 2, with at least one additive selected from the group consisting of esters, ethers, hydrocarbons selected from the group consisting of butane, cyclopropane, decane, 2,3-dimethylpentane, 2,4-dimethylpentane, 2,2-dimethylpropane, heptane, isobutane, limonene, 2-methylbutane, 3-methylhexane, 3-methylpentane, nonane, octane, pentane, pinene, propane, turpentine and undecane, and perfluorocarbons selected from the group consisting of decafluorobutane, dodecafluoropentane, hexafluorocyclopropane, hexafluoroethane, octafluorocyclobutane, octafluoropropane, tetradecafluorohexane, and tetrafluoromethane, the blend comprising 10 to 75 mol percent of the fluoroiodocarbon and 25 to 90 mol percent of the additive, the composition being nonflammable and electrically nonconductive, the fluoroiodocarbon having an ozone depletion potential less than 0.02 and a global warming potential less than that of chlorofluorocarbons, and the additive and the fluoroiodocarbon being nonreactive in the blend.

17. A composition as defined by claim 16, wherein the fluoroiodocarbon is included in an mount of from 20 mol percent to 60 mol percent.

18. A composition as defined by claim 16, wherein the fluoroiodocarbon is included in an mount of from 30 mol percent to 75 mol percent.

19. A composition as defined by claim 16, whereto the additive comprises an ether selected from the group consisting of diethyl ether, diisopropyl ether, dimethyl ether, di-n-butyl, di-n-propyl ether, 1,4-dioxane, ethylene oxide, propylene oxide and tetrahydrofuran.

20. A composition comprising a blend of at least one fluoroiodocarbon of the formula $C_aH_bBr_cCl_dF_eI_fN_g$, wherein a is between and including 1 and 8, b is between and including 0 and 2, c, d and g are each between and including 0 and 1, e is between and including 1 and 17, and f is between and including 1 and 2, with at least one additive selected from the group consisting of esters, ethers, hydrocarbons selected from the group consisting of butane, cyclopropane, decane, 2,3-dimethylpentane, 2,4-dimethylpentane, 2,2-dimethylpropane, heptane, isobutane, limonene, 2-methylbutane, 3-methylhexane, 3-methylpentane, nonane, octane, pentane, pinene, propane, turpentine and undecane, hydrofluorocarbons, and perfluorocarbons selected from the, group consisting of decafluorobutane, dodecafluoropentane, hexafluorocyclopropane, hexafluoroethane, octafluorocyclobutane, octafluoropropane, tetradecafluorohexane, and tetrafluoromethane, the blend comprising 20 to 75 mol percent of the fluoroiodocarbon and 25 to 80 mol percent of the additive, the composition being nonflammable end electrically nonconductive, the fluoroiodocarbon having an ozone depiction potential less than 0.02 and a global warming potential less than that of chlorofluorocarbons, and the additive and the fluoroiodocarbon being nonreactive in the blend.

21. A composition as defined by claim 20, wherein the fluoroiodocarbon is included in an mount of from 20 mol percent to 70 mol percent.

22. A composition as defined by claim 20, wherein the fluoroiodocarbon is included in an amount of from 20 mol percent to 60 mol percent.

23. A composition as defined by claim 20, wherein the fluoroiodocarbon is included in an amount of from 30 mol percent to 75 mol percent.

24. A composition as defined by claim 20, wherein the fluoroiodocarbon comprises trifluoroiodomethane and is included in an amount of from 20 mol percent to 60 mol percent.

25. A composition as defined by claim 20, wherein the fluoroiodocarbon comprises trifluoroiodomethane and is included in an amount of from 30 mol percent to 75 mol percent.

26. A composition as defined by claim 20, wherein the additive comprises a hydrofluorocarbon.

27. A composition as defined by claim 20, wherein the additive comprises propane, butane, pentane, isobutane, cyclopropane or cylcobutane.

28. A composition as defined by claim 20, wherein the at least one fluoroiodocarbon is selected from the group consisting of bromodifluoroiodomethane, chlorodifluoroiodomethane, 1,1,2,2,3,3,4,4,5,5-decafluoro-1,5-diiodopentane, difluorodiiodomethane, difluoroiodomethane, 1,1,2,2,3,3,4,4,5,5,6,6-dodecafluoro-1,6-diiodohexane, fluoroiodomethane, 1,1,1,2,3,3,3-heptafluoro-2-iodopropane, 1,1,2,2,3,3,3-heptafluoro-1-iodopropane, 1,1,2,2,3,3-hexafluoro-1,3-diiodopropane, 1-iodoheptadecafluorooctane, 1-iodopentadecafluoroheptane, iodopentafluorocyclopropane, 1-iodotridecafluorohexane, 1-iodo-undecafluoropentane, N-iodobis-tridecafluorohexane, 1-iodo-undecafluoropentane, N-iodobis-(trifluoromethyl)amine, 1,1,2,2,3,3,4,4,4-nonafluoro-1-iodobutane, 1,1,2,2,3,3,4,4-octafluoro-1,4-diiodobutane, pentafluoroiodoethane, 1,1,2,2-tetrafluoro-1,2-diiodoethane, 1,1,2,2-tetrafluoro-1-iodoethane, 1,1,2-trifluoro-1-iodoethane, trifluoroiodomethane, and trifluoromethyl-1,1,2,2-tetrafluoro-2-iodoethyl ether.

29. A composition as defined by claim 20, wherein the additive comprises an ester selected from the group consisting of ethyl acetate, ethyl butanoate, ethyl propanoate, n-butyl acetate, n-pentyl acetate, hexyl acetate, isobutyl acetate, isopropyl acetate, methyl acetate, methyl butanoate, methyl propanoate, n-propyl acetate and sec-butyl acetate.

30. A composition as defined by claim 20, wherein the additive comprises a hydrofluorocarbon selected from the group consisting of difluoromethane, 1,1-difluoroethane, 1,1,1,2,3,3,3-heptafluoropropane, pentafluoroethane, 1,1,2,2,3-pentafluoropropane, 1,1,1,2-tetrafluoroethane, 1,1,1-trifluoroethane and trifluoromethane.

31. A composition as defined by claim 20, wherein the fluoroiodocarbon comprises $CF_3I$ and the additive comprises at least one component selected from the group consisting of trifluoromethane, difluoromethane, pentafluoroethane, 1,1,1-trifluoroethane, propane, 1,1-difluoroethane, 1,1,1,2-tetrafluoroethane and butane.

32. A composition as defined by claim 20, wherein the fluoroiodocarbon comprises $CF_3I$ and the additive comprises at least one component selected from the group consisting of butane and isobutane.

33. A composition as defined by claim 20, wherein the fluoroiodocarbon comprises $CF_3CF_2CF_2CF_2I$ and the additive comprises at least one component selected from the group consisting of acetone, methyl acetate, tetrahydrofuran and hexane.

34. A composition as defined by claim 20, wherein the fluoroiodocarbon comprises $CF_3CF_2CF_2CF_2I$ and the additive comprises at least one component selected from the group consisting of butanone, ethyl acetate, and heptane.

35. A composition as defined by claim 20, wherein the fluoroiodocarbon comprises $CF_3CF_2CF_2CF_2CF_2CF_2I$ and the additive comprises at least one component selected from the group consisting of heptane and toluene.

36. A composition as defined as claim 20, wherein the fluoroiodocarbon comprises $CF_3CF_2CF_2CF_2CF_2CF_2I$ and the additive comprises at least one component selected from the group consisting of nonane and octane.

37. A composition as defined as claim 20, wherein the fluoroiodocarbon comprises $CF_3CF_2CF_2CF_2CF_2CF_2CF_2I$ and the additive comprises at least one component selected from the group consisting of decane, hexyl acetate, limonene, pinene, turpentine and undecane.

38. A composition as defined by claim 20, wherein the additive comprises an ether selected from the group consisting of diethyl ether, diisopropyl ether, dimethyl ether, di-n-butyl, di-n-propyl ether, 1,4-dioxane, ethylene oxide, propylene oxide and tetrahydrofuran.

39. A composition as defined by claim 20, wherein the fluoroiodocarbon comprises trifluoroiodomethane and the additive comprises a hydrofluorocarbon.

40. A composition as defined by claim 39, wherein the hydrofluorocarbon comprises difluoroethane.

\* \* \* \* \*

UNITED STATES PATENT AND TRADEMARK OFFICE
CERTIFICATE OF CORRECTION

PATENT NO. : 5,716,549
DATED : February 10, 1998
INVENTOR(S) : Nimitz et al

It is certified that error appears in the above-identified patent and that said Letters Patent is hereby corrected as shown below:

Claim 1, column 20, line 5, change "thee" to --the--.

Claim 13, column 20, line 53, change "$C_aH_bBr_cCl_dF_cI_fN_g$" to --$C_aH_bBr_cCl_dF_eI_fN_g$--.

Claim 13, column 20, line 60, change "decade" to --decane--.

Claim 16, column 21, line 19, change "c is between and including 1 and 17" to --e is between and including 1 and 17--.

Claim 19, column 21, line 46, change "whereto" to --wherein--.

Claim 20, column 22, line 5, change "depiction" to --depletion--.

Claim 28, column 22, line 42, delete "1-iodo-undecafluoropentane,".

Signed and Sealed this

Fifth Day of May, 1998

*Attest:*

BRUCE LEHMAN

*Attesting Officer*     *Commissioner of Patents and Trademarks*